G. E. WALTON.
STORAGE AND DISPENSING VESSEL.
APPLICATION FILED JUNE 2, 1908.
927,195.
Patented July 6, 1909.
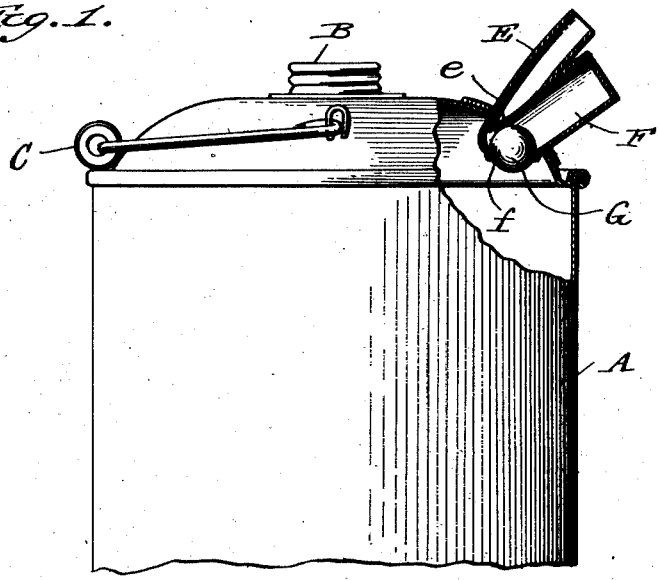
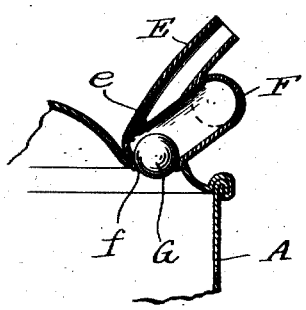
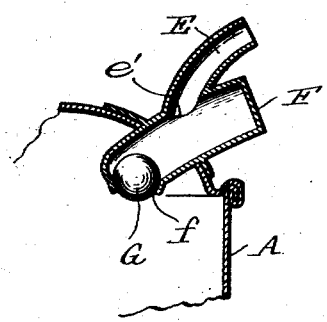
Witnesses
Thomas Durant
Alexander S. Stewart
Inventor
George E. Walton
By Church & Church
his Attorneys

UNITED STATES PATENT OFFICE.

GEORGE EDWARD WALTON, OF DAYTONA, FLORIDA.

STORAGE AND DISPENSING VESSEL.

No. 927,195.        Specification of Letters Patent.        Patented July 6, 1909.

Application filed June 2, 1908. Serial No. 436,289.

*To all whom it may concern:*

Be it known that I, GEORGE EDWARD WALTON, a citizen of the United States, residing at Daytona, in the county of Volusia and State of Florida, have invented certain new and useful Improvements in Storage and Dispensing Vessels; and I do hereby declare the following to be a full, clear, and exact description of the same, reference being had to the accompanying drawings, forming a part of this specification, and to the letters of reference marked thereon.

This invention relates to improvements in liquid storage and dispensing vessels and is especially designed for use on vessels adapted to contain volatile liquids or for use when the vessel is subjected to rough usage such as might cause the liquid to splash about and escape through the discharge opening. The objects of the invention are to provide a storage and dispensing vessel embodying a pouring spout and a weighted closure which automatically closes the discharge duct when the vessel is in normal or upright position and opens the same when the vessel is in pouring position, leaving the full diameter of the discharge duct for the discharge of liquid.

A further object is to prevent any liquid being trapped above the closure when the vessel is turned back to normal or upright position.

A further object of the invention is to provide a pouring spout and closure of simple and cheap construction adapted for incorporation in vessels of any ordinary design and to become a permanent part of the same having an efficient life equal in duration to the life of the vessel itself.

In the accompanying drawings: Figure 1 is a side elevation of a can partly in vertical section embodying the present invention and adapted for storing and dispensing gasolene, oil, etc. Figs. 2 and 3 are detail sectional views showing different arrangements of the discharge duct and closure.

Like letters of reference in the several figures indicate the same parts.

The vessel or receptacle adapted for illustrating the present invention and indicated by the letter A is a well known type of sheet metal can for gasolene, oil, etc., but it will be understood that the invention may be used in connection with any vessel for containing liquids and adapted to be tilted or tipped to discharge the liquid through a pouring spout or duct. The vessel shown is provided with the usual filling orifice closed by a screw cap B and with a handle C by which the vessel may be conveniently transported and handled.

In the preferred embodiment of the invention, the pouring spout and the closure are formed as a complete structure which is permanently secured to the vessel, although they may be in part formed integral with the vessel itself, as will be readily understood by manufacturers of vessels to which the invention is applicable.

The pouring spout lettered E is conveniently curved and projects the necessary distance to deliver the liquid at any desired point with relation to the vessel and the base of the spout merges or opens into a somewhat larger chamber or elongated compartment F adapted to contain a relatively heavy ball G. This compartment may be conveniently termed the closure compartment and communication with the vessel is made through an annular valve seat $f$ in the inner end of the compartment. The valve seat may be located at substantially the line of the vessel wall, as in Fig. 2, or it may be located well within the vessel, as in Figs. 1 and 3. The pouring spout may branch off from the closure compartment either close to the inner end of the same, as in Figs. 1 and 2, or at a point somewhat remote from the inner end, as in Fig. 3. In every instance, however, the arrangement should be such that the ball will when the vessel is tipped or tilted move far enough to leave a free and unobstructed passage through the compartment and into the base of the pouring spout, and the size of the opening into the pouring spout should be such that the ball can never enter the same. The entrance opening to the pouring spout may be narrow and extend practically to the end of the closure compartment as at $e$, Figs. 1 and 2, or it may be small and substantially circular, as at $e'$, Fig. 3, the only real essential being that it be arranged to extend at an acute angle or diagonally above the longitudinal center of the ball compartment. The preferred arrangement of the closure compartment is at an angle to the base of the pouring spout or transversely of the entrance opening into the spout, and it extends in such direction that when the vessel is tipped or tilted the ball will leave its seat and pass to the outer end of the compartment. While the most natural and convenient arrangement of the compartment is below the spout, I do not wish to be limited to the particular location shown, for it may be departed from within limits without affecting the efficient operation of the device.

When the vessel is in normal or upright position the inclination of the closure compartment to the horizon is such that the ball moves automatically to its seat and preferably projects partly within the vessel itself. Being a relatively heavy metal ball ordinary movements or shocks to which the vessel may be subjected will not dislodge the same, and hence the escape of liquid from splashing about in the can or by evaporation or by volatilization is absolutely prevented. The angular arrangement of the closure compartment with relation to the pouring spout causes the liquid flowing back when the vessel is turned into upright position to pass into the vessel before the valve moves to its seat, and hence no liquid will be trapped above the valve.

Having thus described the invention, what is claimed as new and desired to be secured by Letters-Patent, is:

1. A vessel for storing and dispensing liquids embodying a pouring spout and a closure compartment of greater diameter than the spout closed at its outer end and into which the spout opens intermediate the ends of the compartment, said spout and compartment projecting at an acute angle with relation to each other and the spout being above the longitudinal center of the compartment, a valve seat at the inner end of the compartment and a heavy ball valve in the compartment adapted to unseat itself by gravity and pass beyond the opening to the spout before the spout is inclined to its pouring position and to seat itself by gravity after the spout has been elevated above its pouring position whereby the liquid in the spout is returned to the vessel before the valve reaches its seat.

2. A vessel for storing and dispensing liquids embodying a pouring spout and substantially cylindrical closure compartment projecting upwardly from the vessel and at an acute angle with respect to each other, the said spout being at the greater elevation and having its opening into the compartment of less diameter than the compartment and located intermediate the ends of the latter, the said compartment being closed at the outer end and having a valve seat at the end forming the communicating opening between the vessel and spout and a ball valve located in the compartment and of greater diameter than the entrance to the spout.

GEORGE EDWARD WALTON.

Witnesses:
J. F. O'BOYLE,
GEORGE WALTON, Jr.,
C. M. BINGHAM, Jr.